United States Patent
Ee et al.

(10) Patent No.: US 8,049,995 B1
(45) Date of Patent: Nov. 1, 2011

(54) BASEPLATE HUB GEOMETRY FOR REDUCED AFTER-SWAGING SUSPENSION DEFLECTION

(75) Inventors: Kuen Chee Ee, Murietta, CA (US); Peter Hahn, Wildomar, CA (US)

(73) Assignee: Magnecomp Corporation, Murrieta, CA (US)

( * ) Notice: Subject to any disclaimer, the term of this patent is extended or adjusted under 35 U.S.C. 154(b) by 472 days.

(21) Appl. No.: 12/344,429

(22) Filed: Dec. 26, 2008

Related U.S. Application Data (60) Provisional application No. 61/114,394, filed on Nov. 13, 2008.

(51) Int. Cl.
*G11B 5/48* (2006.01)
(52) U.S. Cl. .............. 360/244.6; 360/255; 360/254.6; 360/255.5; 360/255.9
(58) Field of Classification Search .............. 360/244.6, 360/255, 254.6, 255.5, 255.9
See application file for complete search history.

(56) References Cited

U.S. PATENT DOCUMENTS

| | | | |
|---|---|---|---|
| 6,183,841 B1 | 2/2001 | Hanrahan et al. | |
| 6,297,934 B1 | 10/2001 | Coon | |
| 7,130,156 B1 | 10/2006 | Fossum | |
| 7,190,555 B2 | 3/2007 | Hanrahan et al. | |
| 7,633,717 B1 | 12/2009 | Fossum et al. | |
| 7,706,106 B1 * | 4/2010 | Mei et al. | 360/255 |
| 2006/0174472 A1 | 8/2006 | Zhang et al. | |
| 2010/0228518 A1 * | 9/2010 | Shakespeare et al. | 702/155 |

* cited by examiner

*Primary Examiner* — Connie Yoha
(74) *Attorney, Agent, or Firm* — Intellectual Property Law Offices of Joel Voelzke, APC

(57) ABSTRACT

A method of designing a hard disk drive suspension swage hub geometry for an actuator arm having upper and lower suspensions attached thereto, includes using a finite element analysis model to simulate the effects of swaging the suspensions to the actuator arm, identifying relevant geometric parameters of the suspensions, for each suspensions performing a linear regression to fit an equation containing the geometric parameters to a normal force of the suspension to the actuator arm after swaging according to the fine element analysis, identifying a desired range of differences between the normal forces, using the desired difference range, and solving for values of geometric parameters to produce a set of target design parameters for the suspension swage hubs.

24 Claims, 7 Drawing Sheets

BASEPLATE HUB GEOMETRY FOR REDUCED AFTER-SWAGING SUSPENSION DEFLECTION

CROSS-REFERENCE TO RELATED APPLICATIONS

This application claims priority from U.S. Provisional Patent Application No. 61/114,394 filed Nov. 13, 2008, which is hereby incorporated by reference in its entirety.

BACKGROUND OF THE INVENTION

1. Field of the Invention

This invention relates to the field of hard disk drive suspensions. More particularly, this invention relates to improved baseplate hub geometry to achieve reduced after-swaging deflection of the suspensions while maintaining sufficient retention torque.

2. Description of Related Art

An actuator is a mechanism for moving disk drive suspensions linearly into position at a disk surface. The actuator E-block has one or more arms to which the head gimbal assembly load beams are attached, usually two load beams per arm, one above, the upper load beam, and one below, the lower load beam. The load beams are fixed by welding to the planar base of a mounting plate that has an annular boss rising from the base. The lower load beam is attached to a lower mounting plate base and the lower mounting plate base is inserted into the lower opening of a bore that extends through the arm from its lower face to its upper face. The upper and lower mounting plates thus are reversed in orientation and have their respective bosses opposed and differently affected by the staking (swaging) operation. The terms upper and lower herein as applied to mounting plates refer to the direction of swaging. Thus the mounting plate that is closer to the origin of the swaging movement is the upper mounting plate and the mounting plate that is closer to the destination of the swaging movement is the lower mounting plate.

To secure the oppositely directed mounting plates to the actuator arm, the mounting plate bosses are radially expanded to engage the bore interior wall by swaging. Typically, the swaging step includes forcing two swage balls through the mounting plate bosses to expand them. The first and smaller swage ball expands the bosses to a first extent, and the second and larger swage ball expands the bosses even more until the bosses are firmly pressed up against the interior wall of the actuator arm bore.

There is in addition to the radial force being exerted a downward axial force associated with the movement of the staking tool. This force has a different effect on the upward facing (lower) mounting plate, which tends to deform convex toward the bore, from its effect on the downward facing (upper) mounting plate, which tends to deform concave toward the bore.

Unfortunately, the swaging process can result in distortion of the mount plate and actuator arm, and hence misalignment of the suspension from the desired angle. The different deformation effects on the upper and lower mounting plates cause different and difficult to control changes in the shape of the mounting plates and their intended suspension gram preloads. Miniaturization and tighter tolerance requirements have made distortion after the swaging operation increasingly problematic. The distortion produces deviation from the target suspension gramload value, which is a critical parameter for the performance and functionality of a suspension assembly. In addition to gramload changes, two other important aspects of a successful swaging operation are retention torque and swage defect. Retention torque is the amount of torque applied to the suspension that overcomes the staking of the mount plate to the actuator arm. The retention torque must therefore be sufficiently high to prevent suspension failure. As overall dimensions get smaller, providing a baseplate design that will exhibit a sufficiently high retention torque has become a challenging task.

Several patents have attempted to address the after-swaging deflection problem. U.S. Patent Publication No. 2006/0174472 by Zhang et al. purports to provide a method of reducing the effect of arm distortion after swaging, by providing a baseplate hub design such that the contact after swaging is close to the neutral axis of the arm. The methodology appears to apply to an actuator arm with one suspension attached. U.S. Pat. No. 7,190,555 issued to Hanrahan et al. suggests that a thicker arm compared to the baseplate hub outer diameter will provide more rigidity and thus less distortion after swaging. U.S. Pat. No. 6,183,841 issued to Hanrahan et al. purports to provide a general criterion for a low profile baseplate design with good retention torque after swaging. U.S. Pat. No. 6,297,934 issued to Coon purports to reduce after-swaging gram load differentials by providing a sloped actuator arm, thereby providing a different amount of mechanical support to the upper suspension than to the lower suspension. U.S. Pat. No. 7,130,156 issued to Fossum purports to increase retention torque by providing a swaging hole with a tapered portion that increases in diameter in a direction away from the flange portion.

SUMMARY OF THE INVENTION

The present invention provides an approach and algorithm to optimize base plate geometry for reducing suspension distortion after swaging yet maintaining sufficient retention torque for an actuator arm with two suspensions attached, one on each side.

In the invention, a 2-D finite element model is established to study the swaging process for the case of a single arm with a baseplate attached on both sides of the arm. The swage balls being forced through the actuator arm to stake the suspensions to the arm is also modeled and simulated. The tension suspension head H2 (the first base plate hub to be contacted by the swage ball) and the compression suspension head H1 (the second base plate hub to be contacted by the swage ball) go through different loading and deformation histories, resulting in distinctive contact pressure distribution and contact locations, and are therefore modeled together. The uneven distribution and location of the resulting contact or normal forces is the major contributor to arm distortion.

In the exemplary embodiment, five geometry parameters are chosen as variables. A parametric study is performed by varying the geometrical dimensions (the five variables chosen). Data from the simulation is then fitted to a curve using linear regression.

A desired range for the difference in H1 normal force and H2 normal force is then set. Using the equations for H1 normal force and H2 normal force according to the parametric study, different hub geometries that satisfy the desired H1 and H2 normal force differences can then be calculated. A particular geometry is then chosen from the candidate hub geometries that were calculated.

In the exemplary embodiment, the following geometric parameters were defined as follows, with reference to FIG. 7:

| | | |
|---|---|---|
| $x_1 = (1/2)w(a + H_{IS}) + (1/2)bc =$ | area of zone 3 | Equation (3-1) |
| $x_2 = b =$ | width of zone 2 | Equation (3-2) |
| $x_3 = (H_{IS} + c)/a =$ | top transition ratio | Equation (3-3) |
| $x_4 = (a - c)/a =$ | bottom transition ratio | Equation (3-4) |
| $x_5 = h =$ | height of zone 2 | Equation (3-5) |

It was found that the H1 and H2 normal forces fit fairly well the following equation derived through linear regression applied to the finite element model analysis:

$$\text{Force } H1 = k_1 x_1 + k_2 x_2 + k_3 x_3 + k_6$$

where $x_1$, $x_2$, and $x_3$ are as defined above, and where $k_1$, $k_2$, $k_3$, and $k_6$ are constants from the linear regression model, and are pertinent to arm thickness, swage ball size, etc. used. For example, if arm thickness is reduced or the swage ball size is increased, these constants will change correspondingly.

A similar linear regression model can be established separately for the H2 normal force.

Figure 7:
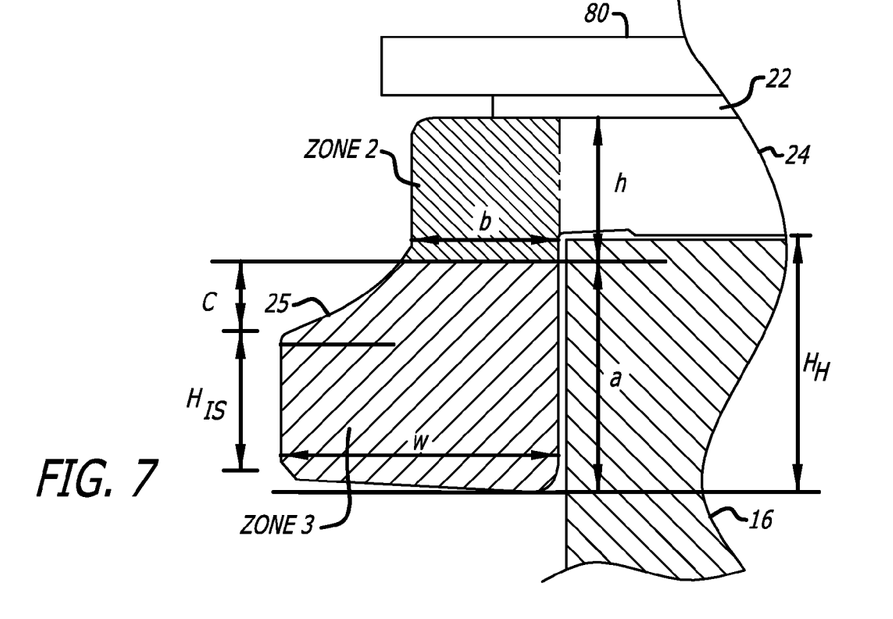
FIG. 7 is a sectional view of a portion of an E-block and upper base plate and load beam, showing geometric parameters identified as being salient according to the present invention.

The baseplate hub design can then be optimized by considering the simultaneous impacts of hub dimensions on both the tension and compression heads. In the illustrative example, reduction in arm distortion is achieved by increasing the force difference between compression and tension heads in order to reduce the arm distortion, although an excessively large force difference between the two suspensions is also undesirable since it will cause base plate distortion in the opposition direction. Thus, a criterion for an optimized design can be set as follows:

| | | |
|---|---|---|
| 30 Newtons < Force H1 − Force H2 < 70 Newtons | | Equation (1) |
| 30 Newtons < $1039x_1 + 491x_2 + 96x_3 - 108x_4 + 194x_5 - 198$ < 70 Newtons | | Equation (2) |
| where | | |
| $x_1 = (1/2)w(a + H_{IS}) + (1/2)bc$ | = area of zone 3 | Equation (3-1) |
| $x_2 = b$ | = width of zone 2 | Equation (3-2) |
| $x_3 = (H_{IS} + c)/a$ | = top transition ratio | Equation (3-3) |
| $x_4 = (a - c)/a$ | = bottom transition ratio | Equation (3-4) |
| $x_5 = h$ | = height of zone 2 | Equation (3-5) | where the geometric parameters a, b, c, w, h, and $H_{IS}$ are as shown in FIG. 7, and can be described as:

a=hub reduced diameter region height
b=hub neck width
c=hub shoulder depth
w=hub radial width
h=hub opening depth
$H_{IS}$=hub inner surface depth A corresponding set of design parameters a, b, c, w, h, and $H_{IS}$ is selected for Equations (3-1) through (3-5) above, such that Equation (2) is satisfied.

The inventors have identified 20-100 Newtons as a desired range of differences for normal forces after swaging, and more preferably 30-70 Newtons, and more preferably still 30-50 Newtons.

The methodology of the present invention can be used with different geometry parameters. In the illustrative embodiment, the geometric parameters $x_1$-$x_5$ were chosen. Alternatively, a different set of geometric parameters could have been chosen, with otherwise the same methodology applied.

The linear regression model is useful for at least two purposes. First, the model can be run, and the expected arm deflection can be calculated, much more quickly using the linear regression model than with the full, non-linear finite element analysis model. Thus, the design can be optimized significantly more quickly using the linear regression model. Second, the linear regression equations give, upon inspection of the equations, a feel for how varying the different parameters will affect the results, and thus providing a direction to optimize a design. No such feel can be obtained by viewing the finite element analysis model, which is non-linear.

Exemplary embodiments of the invention will be further described below with reference to the drawings, in which like numbers refer to like parts.

DETAILED DESCRIPTION OF THE PREFERRED EMBODIMENTS

Figure 1:
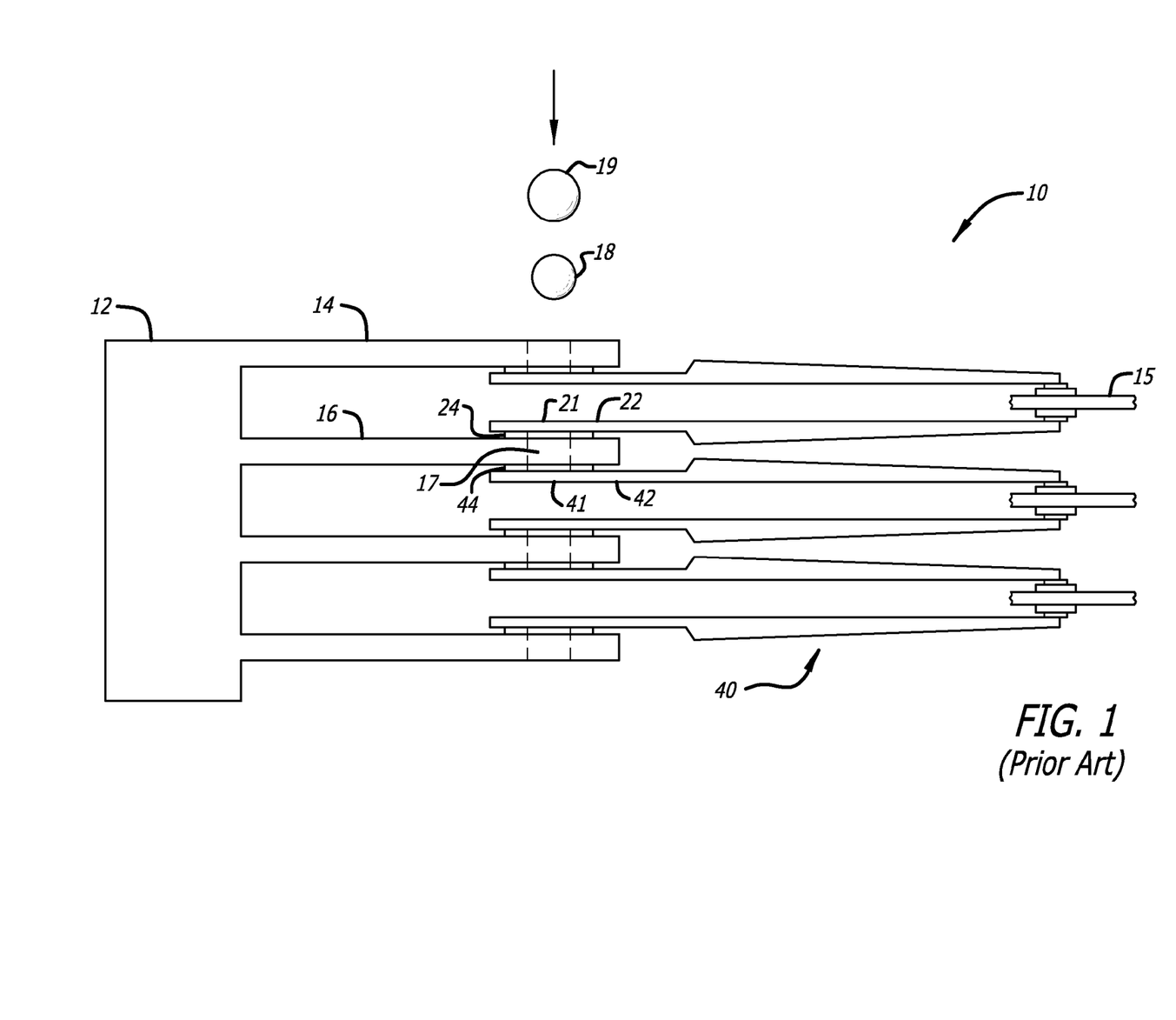
FIG. 1 is a side elevation view of a typical disk drive and head stack assembly.

With reference to FIG. 1, a typical head stack assembly 10 includes an actuator E-block 12 having E-block arms 14, 16, and others. E-block arm 16 has associated therewith an upper suspension 20 and a lower suspension 40. Upper suspension 20 includes upper load beam 22 and upper baseplate24. Likewise, lower suspension 40 includes lower load beam 42 and lower baseplate 44. Upper suspension 20 reads data from, and writes data do, first magnetic hard drive platter15. During the swaging process, first swage ball 18 is forced through upper suspension swage hole 21 and through lower suspension swage hole 41, and E-block arm swage hole 17. The first swage ball 18 is followed by second swage ball 19, which is slightly larger than first swage ball 18. More generally, the swaging is performed using one or more swaging tools, which can be swage balls or other implements.

Figure 2:
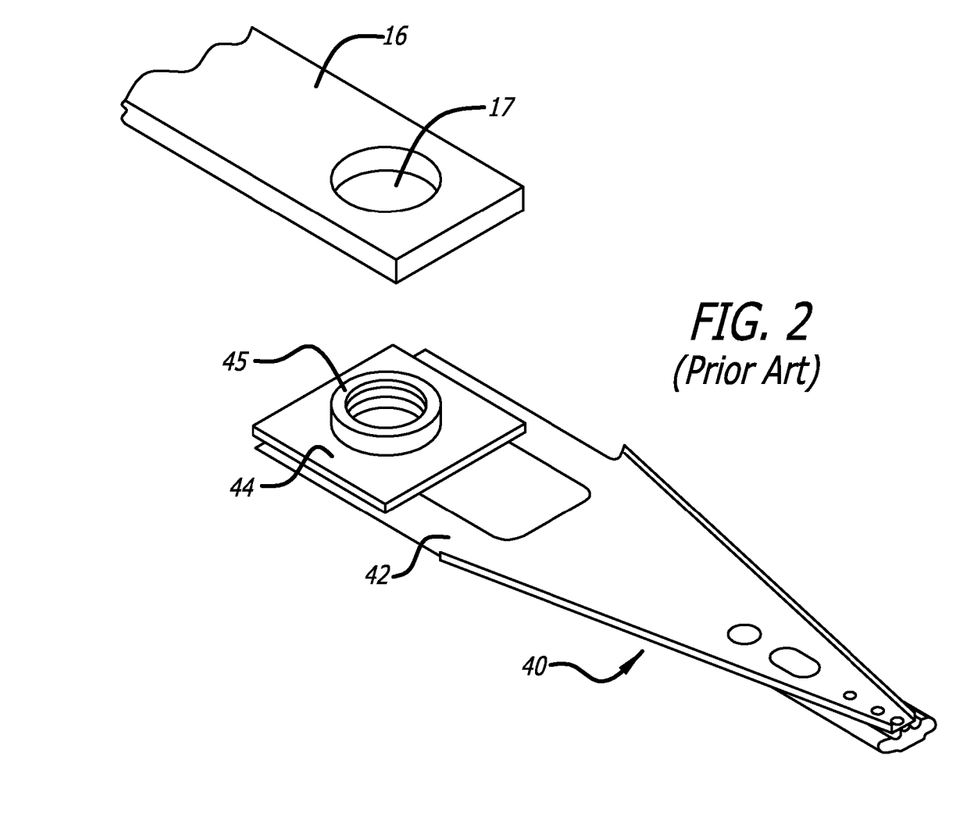
FIG. 2 is a perspective view of a typical suspension load beam and baseplate, with an E-block arm.

FIG. 2 is a perspective view of a suspension load beam and baseplate, with an E-block arm. The figure shows for simplicity of illustration only E-block arm 16 and lower suspension 40, including lower load beam 42 and lower base plate 44. Load beam 42 is typically affixed to baseplate 44 by welding, although other attachment methods such as adhesives are possible. During swaging, baseplate hub 45 gets forced against the inside walls of E-block arm swage hole 17. The force with which baseplate hub or swage hub 45 pushes up against the inside walls of swage hole 17 after swaging defines the retention torque.

Figure 3:
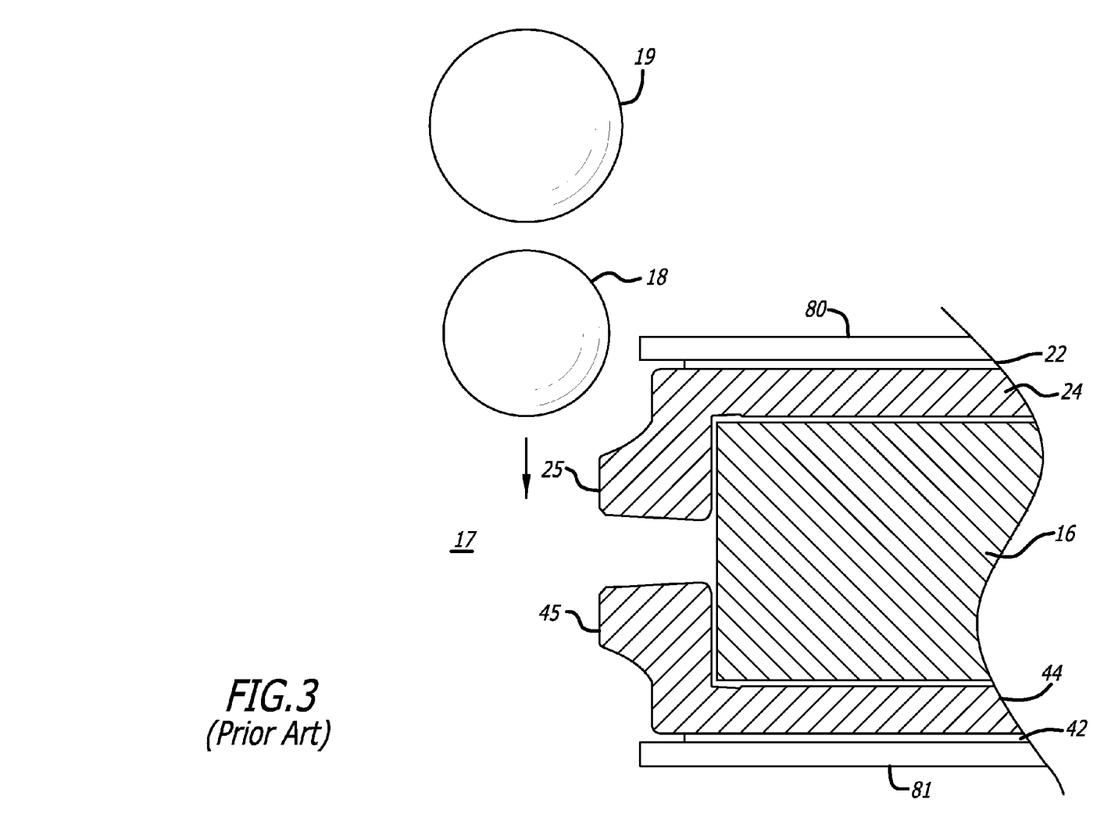
FIG. 3 is a sectional view of a typical E-block arm upper and lower suspension baseplates before swaging.

FIG. 3 is a sectional view of an E-block arm, and upper and lower suspension baseplates before swaging. Upper baseplate 24, with upper load beam 22 attached thereto, is mounted on E-block arm 16 such that upper baseplate hub 25 rests within E-block arm swage hole 17. Similarly, lower baseplate 45, with lower load beam 42 attached thereto, is mounted on E-block arm 16 such that lower baseplate hub 45 rests within E-block arm swage hole 17. Upper and lower clamps 80 and 81 hold the assembly together firmly together during swaging. Clamps 80 and 81 are withdrawn after swaging. The foregoing description of FIGS. 1-3 is according to conventional and known designs and manufacturing methods.

The process of the present invention for selecting particular dimensional parameters so that the resulting design after swaging more closely meets the desired design goals, will now be discussed. The present invention provides a design approach to optimize base plate geometry for arm deflection (distortion) after swaging for an E-block arm having both an upper and lower suspension, which has not been considered in the prior art. According to the invention, an approach to optimize the baseplate hub geometry for increased retention torque and reduced arm distortion is established through the use of a linear regression model. The interactions between baseplate design and arm distortion are considered in this approach.

Figure 4:
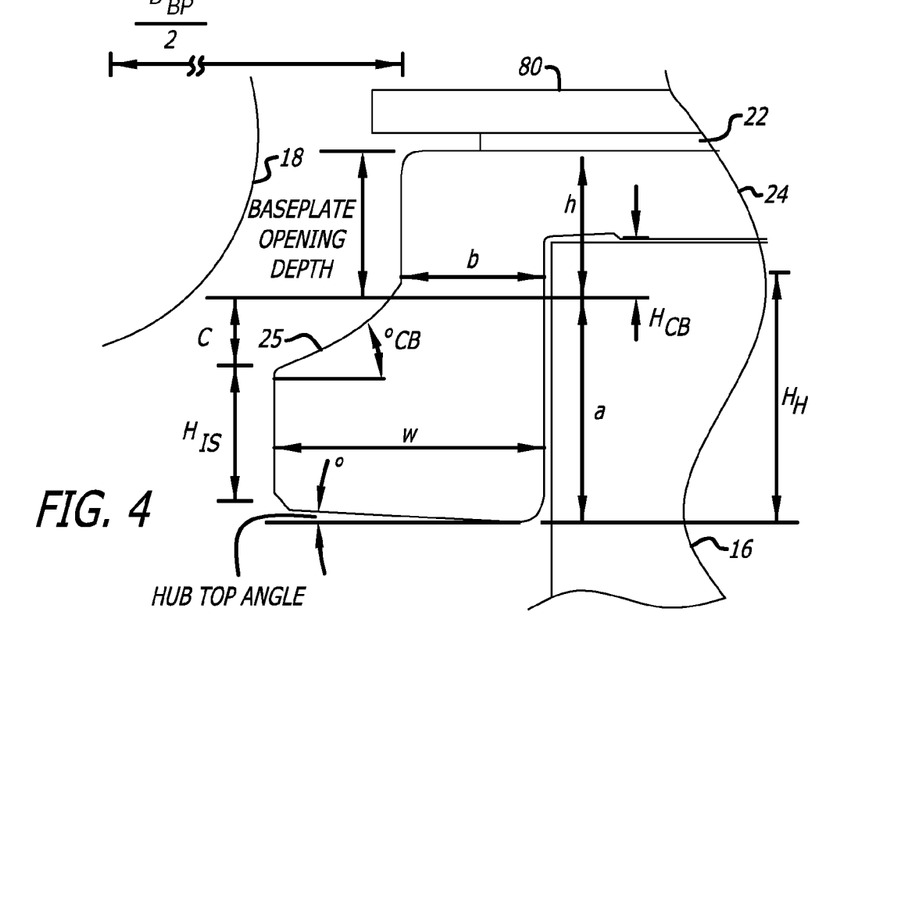
FIG. 4 is sectional view of a portion of an E-block, upper base plate and load beam, and swage ball, showing parameters selected for analysis according to the present invention.

According to the invention, first, a 2-D finite element model is established to study the swaging process for the case of a single E-block actuator arm having a baseplate attached on both sides of the arm. A two-pass swaging operation is modeled, the model components including the swage balls, swage key, base plate, hinge, and E-block arm. The swaging process is modeled for large deformations with non-linear elastic-plastic material properties for the baseplates 24 and 44, and E-block arm 16. Swaging by passing first swage ball 18 through hubs 25 and 45 severely deforms hubs 25 and 45; the affected regions are further grown via swaging by second swage ball 19. FIG. 4 shows the relevant geometric parameters (dimensions) that were selected for analysis according to the present invention. Other dimensions were held constant for the study.

Figure 5:
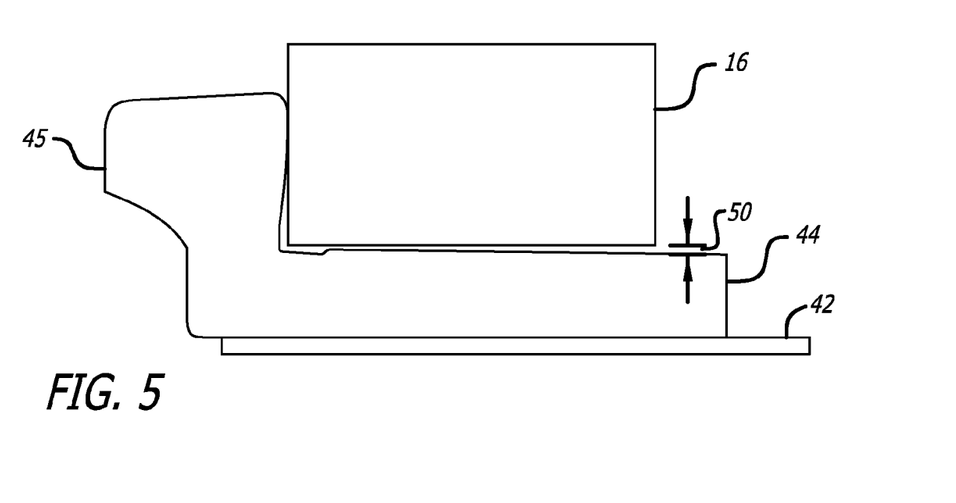
FIG. 5 is a sectional view of a lower baseplate and actuator arm after swaging.

After swaging, clamps 80 and 81 are withdrawn. FIG. 5 illustrates a typical result of swaging on lower baseplate 44. Hub 45 has been deformed by the swaging and forced firmly up against E-block arm 16. Once the clamps are withdrawn, a certain amount of springback occurs due to the presence of elastic as well as plastic deformation. This springback effect has produced a gap 50 between lower baseplate 44 and the swage pad (not specifically shown) of E-block arm 16. In the figure, gap 50 is shown exaggerated for purposes of illustration. Generally speaking, gap 50 might be a constant gap, or baseplate 44 might be slightly angled with respect to E-block 16 thus making gap 50 an angled gap. Gap 50 defines the after-swaging distortion (deflection) of lower baseplate 44. In the finite element analysis performed, noticeable spring-back was observed.

Next, a parametric analysis was performed by varying the geometrical dimensions shown in FIG. 4. The output variables calculated were: normal force between the baseplate hub 45 outside diameter (OD) and the arm hole 17 inside diameter (ID) (corresponding to retention torque); the resulting arm deflection; and suspension head H1/H2 gaps measured from arm surface (corresponding to baseplate distortion for compression and tension suspension heads, respectively).

Figure 6:
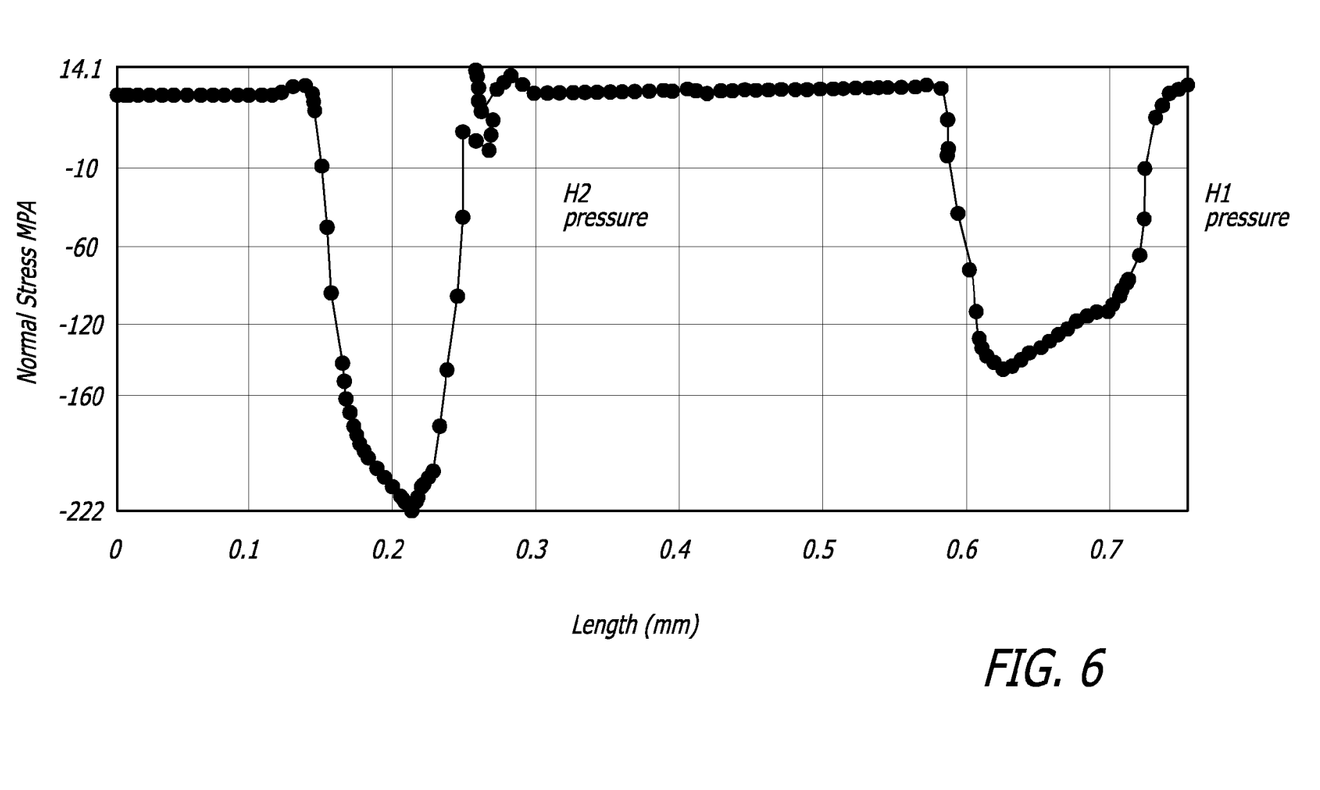
FIG. 6 is plot of normal pressure exerted by the upper and lower baseplate on the interior wall of the actuator arm bore, as a function of thickness of the arm, according to a simulation.

FIG. 6 is plot of normal pressure exerted by the upper and lower baseplates on the interior wall of the actuator arm hole, according to a simulation. The inter-relationships between the baseplate hub design and the arm deflection can be readily visualized from the typical contact pressure distribution between the baseplate hub outside diameter (OD) and the arm inside diameter (ID) as shown in the figure. During the swaging operation, the upper baseplate hub 25 and the lower baseplate hub 45 experience different loading and deformation histories, resulting in the distinctive contact pressure distribution and contact locations shown in the figure. Upper baseplate hub 25 experiences predominantly tensile forces, and thus can be referred to as the tension hub. Lower baseplate hub 45 experiences predominantly compression forces, and thus can be referred to as the compression hub. The uneven distributions and locations of the resulting forces are the major contributors to after-swaging arm distortion.

The next step in the process is to establish a mathematical model based on a chosen set of input variables (geometric parameters) that predicts, within an acceptable level of accuracy, the actual outputs as determined from the finite element model. For the example given, it turns out that, with the calculated output variables, an acceptably accurate linear regression model can be established based on the input variables shown in FIG. 7. Thus, geometric parameters shown in FIG. 7 were identified as being the relevant geometric parameters.

In particular, it was found that the H1 normal force fits fairly well the following equation derived through linear regression applied to the finite element model analysis:

$$\text{Force } H1 = k_1 x_1 + k_2 x_2 + k_3 x_3 + k_6$$

where $x_1$, $x_2$, and $x_3$ are as defined in equations (3-1) thru (3-5), and where $k_1$, $k_2$, $k_3$, and $k_6$ are constants from the linear regression model, and are pertinent to arm thickness, swage ball size, etc. used. For example, if arm thickness is reduced or the swage ball size is increased, these constants will change correspondingly.

A similar linear regression model can be established separately for the H2 normal force.

Optimization of baseplate hub design can then be made by considering the simultaneous impacts of hub dimensions on both the tension and compression heads. During swaging, suspension hubs 25 and 45 and the E-block arm 16 itself are plastically deformed. When E-block arm 16 is deformed, the whole arm 16 and attached suspensions 20 and 40 shift up or down. In the illustrative example, reduction in arm distortion is achieved by increasing the force difference between compression and tension heads in order to reduce the arm distortion, although an excessively large force difference between the two suspensions is also undesirable since it will cause arm distortion in the opposition direction. The inventors have identified 20-100 Newtons as a desired range of differences for normal forces after swaging, and more preferably 30-70 Newtons, and more preferably still 30-50 Newtons, in order to minimize arm distortion. When the nominal normal force is 140 Newtons, as is fairly representative of recent head stack assemblies, the differences in normal forces represent approximately 14-71% difference between the normal forces, and more preferably 21-50% difference between normal forces, and more preferably still 21-36% difference between normal forces.

Thus, a criterion for an optimized design can be set as follows:

| | |
|---|---|
| 30 Newtons < Force H1 − Force H2 < 70 Newtons | Equation (1) |
| 30 Newtons < $1039x_1 + 491x_2 + 96x_3 - 108x_4 + 194x_5 - 198$ < 70 Newtons | Equation (2) |
| where | |
| $x_1 = (\frac{1}{2})w(a + H_{IS}) + (\frac{1}{2})bc$ = area of zone 3 | Equation (3-1) |
| $x_2 = b$ = width of zone 2 | Equation (3-2) |
| $x_3 = (H_{IS} + c)/a$ = top transition ratio | Equation (3-3) |
| $x_4 = (a - c)/a$ = bottom transition ratio | Equation (3-4) |
| $x_5 = h$ = height of zone 2 | Equation (3-5) | where the geometric parameters a, b, c, w, h, and $H_{IS}$ are as shown in FIG. 7.

Figure 8:
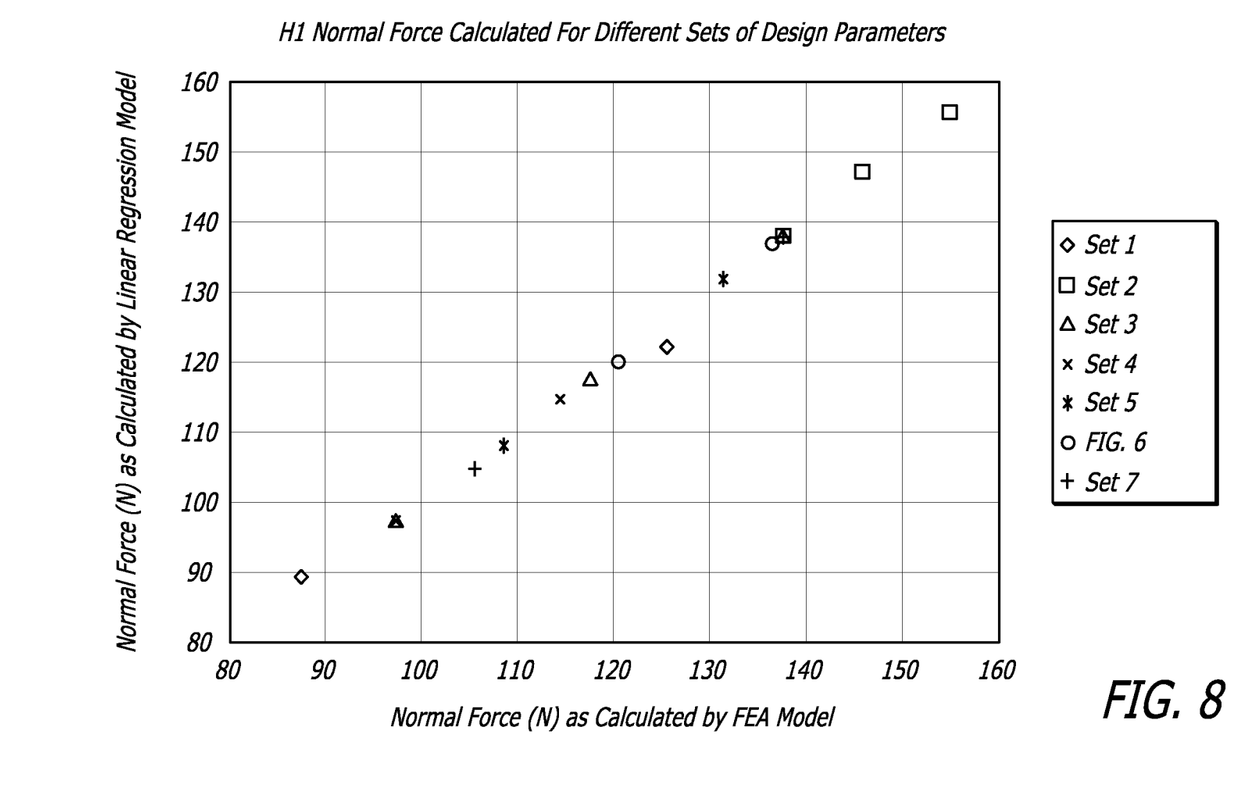
FIG. 8 is a plot of the predicted H1 normal force according to linear regression model produced according to the method of the present invention, and according to a finite element analysis model using a variety of different geometric parameters.

FIG. 8 is a plot of the predicted H1 normal force according to both the resulting linear regression model, and according to the finite element analysis (FEA) model, for various chosen sets of design dimensions. The figure shows that the linear regression model produces an output prediction that closely matches the FEA prediction. The linear regression model provides an understanding of the effect of hub dimensions. For example, increasing the width of zone 2 (decreasing the baseplate opening diameter) will increase the normal force for H1. The baseplate hub design can then be optimized by considering the simultaneous impacts of hub dimensions on both the compression and tension suspension heads. An illustrative example is given in Table 1, in which design improvement is made by the criterion of increasing the force difference between compression and tension heads in order to reduce the arm distortion, although an excessively large force difference between the two suspensions is also undesirable since it will cause base plate distortion in the opposition direction.

TABLE 1

| Case | Calculated H1 Force (N) | Calculated H2 Force (N) | Remarks |
|---|---|---|---|
| Nominal | 145 | 141 | Measurement data indicated that the gramload change for compression suspension head (H1) is higher. The lower retention torque value on H1 suggested arm deflection as major contributor. |
| Design B2 | 195 | 132 | Design target to increase force difference to −60 Newtons in order to minimize arm distortion. |

In addition to Equation (1), other design constraints may exist, such as minimum retention torque required, maximum hub height, etc. Such constraints, when present, will further refine the design.

An optimized design can be established in the following way: a corresponding set of dimensional parameters a, b, c, w, h, and $H_{IS}$ is selected such that equations (3-1) thru (3-5) above will satisfy Equation (2). The resulting dimensions define a set of target geometric values, or design dimensions.

Table 2 below provides two target designs that satisfy the design criteria of Equation (1) to optimize (minimize) arm deflection.

TABLE 2

| Hub Dimension | Design B2 (mm) | Design C2 (mm) |
|---|---|---|
| $D_{BP/2}$ | 1.17 | 1.181 |
| $H_H$ | 0.3465 | 0.322 |
| $H_{IS}$ | 0.16 | 0.182 |
| $H_{CB}$ | 0.141 | 0.097 |
| Baseplate opening depth | 0.21 | 0.158 | where the listed parameters are as defined in FIG. 4 and can be described as:

$D_{BP/2}$=radius diameter/2) of the base plate opening
$H_H$=hub height
$H_{IS}$=hub inner surface depth
$H_{CB}$=hub neck height Once the target design dimensions are established, the hubs are constructed to have actual dimensions that approximately equal the target design dimensions. Of course, the actual geometric dimensions will vary somewhat from the target design dimensions due at least to manufacturing tolerances. The actual dimensions might vary from the design dimensions by 5%, 10%, or as much as 20% or more.

Additional test and simulation data are given in U.S. Provisional Patent Application No. 61/114,394 filed Nov. 13, 2008, which is hereby incorporated by reference in its entirety.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A method of swaging both an upper suspension and a lower suspension to an actuator arm for use in a disk drive suspension, comprising:
   using a simulation model to simulate the effects of swaging said suspensions to said actuator arm;
   identifying relevant geometric parameters of said suspensions;
   performing a parametric analysis using said identified geometric parameters;
   for each suspension, performing a linear regression to fit an equation containing said geometric parameters to a normal force of said suspension to said actuator arm after said swaging according to results of said simulation model;
   identifying a desired range of difference between said normal forces;
   using said desired difference range of said normal forces and said equations for said normal forces, solving for values of said geometric parameters to produce a set of target geometric parameter values;
   providing a suspension having actual geometric parameters that approximately equal said target geometric parameter values; and
   swaging said suspensions to said actuator arm.

2. The method of claim 1 wherein said desired range of differences between said normal forces is the range of 20-100 Newtons.

3. The method of claim 1 wherein said desired range of differences between said normal forces is the range of 30-70 Newtons.

4. The method of claim 1 wherein said desired range of differences between said normal forces is the range of 30-50 Newtons.

5. The method of claim 1 wherein said range of differences between said normal forces is in the range of 14-71%.

6. The method of claim 1 wherein said desired range of differences between said normal forces is the range of 21-50%.

7. The method of claim 1 wherein said desired range of differences between said normal forces is the range of 21-36%.

8. The method of claim 1 wherein said geometric parameters comprise the parameters of hub reduced diameter region height, hub neck width, hub shoulder depth, hub radial width, hub opening depth, and hub inner surface depth.

9. The method of claim 1 wherein said geometric parameters satisfy the relationship $$30 \text{Newtons} < 1039x_1 + 491x_2 + 96x_3 - 108x_4 + 194x_5 - 198 < 70 \text{ Newtons}$$

where
- $x_1 = (\frac{1}{2})w(a+H_{IS}) + (\frac{1}{2})bc$
- $x_2 = b$
- $x_3 = (H_{IS}+c)/a$
- $x_4 = (a-c)/a$
- $x_5 = h$ and where
- a=hub reduced diameter region height
- b=hub neck width
- c=hub shoulder depth
- w=hub radial width
- h=hub opening depth, and
- $H_{IS}$=hub inner surface depth.

10. The method of claim 1 wherein a first one of said suspensions has a hub that undergoes primarily compression during said swaging thereby defining a compression hub, and the other one of said suspensions has a hub that undergoes primarily tensile forces during swaging thereby defining a tension hub, and an after-swaging normal force of the compression hub is greater than an after-swaging normal force of the tension hub.

11. The method of claim 10 wherein said compression hub normal force is at least 20 Newtons greater than said tension hub normal force.

12. The method of claim 10 wherein said compression hub normal force is
less than 100 Newtons greater than said tension hub normal force.

13. An actuator arm having two suspensions attached thereto, produced according to the method of claim 1.

14. A disk drive comprising a disk storage media and the actuator arm and suspensions according to claim 13.

15. In a disk drive, a method of swaging both an upper suspension and a lower suspension to a common actuator arm, the suspensions including respective swage bosses, a first one of said swage bosses undergoing primarily compressive forces during said swaging and a second one of said swage bosses undergoing primarily tensile forces during said swaging, the method comprising:
 identifying a desired range of post-swaging differences between normal forces of the two swage bosses after said swaging; and
 swaging said suspensions to said actuator arm so as to produce a normal force difference that is within said desired range of differences.

16. The method of claim 15 wherein said desired range of differences is within the range of 20-100 Newtons.

17. The method of claim 15 wherein said desired range of differences is within the range of 30-70 Newtons.

18. The method of claim 15 wherein said desired range of differences is within the range of 30-50 Newtons.

19. An actuator arm having two suspensions attached thereto, produced according to the method of claim 15.

20. A disk drive comprising a disk storage media and the actuator arm and suspensions according to claim 19.

21. A hard disc drive suspension assembly comprising first and second suspensions attached on opposite faces of an actuator arm, said first and second suspensions each having a base plate and swage hub having dimensions within ±20% of the following design dimensions:

| | |
|---|---|
| $D_{BP/2}$ = | 1.17 mm |
| $H_H$ = | 0.3465 mm |
| $H_{IS}$ = | 0.16 mm |
| $H_{CB}$ = | 0.141 mm |

Baseplate opening depth=0.21 mm
where
- $D_{BP/2}$=radius diameter/2 of the base plate opening
- $H_H$=hub height
- $H_{IS}$=hub inner surface depth, and
- $H_{CB}$=hub neck height.

22. The suspension assembly of claim 21 wherein said dimensions are within ±10% of said design dimensions.

23. A hard disc drive suspension assembly comprising first and second suspensions attached on opposite faces of an actuator arm, said first and second suspensions each having a base plate and swage hub having dimensions within ±20% of the following design dimensions:

| | |
|---|---|
| $D_{BP/2}$ = | 1.181 mm |
| $H_H$ = | 0.322 mm |
| $H_{IS}$ = | 0.182 mm |
| $H_{CB}$ = | 0.097 mm |

Baseplate opening depth=0.158 mm
where
- $D_{BP/2}$=radius (diameter/2) of the base plate opening
- $H_H$=hub height
- $H_{IS}$=hub inner surface depth, and
- $H_{CB}$=hub neck height.

24. The suspension assembly of claim 23 wherein said dimensions are within ±10% of said design dimensions.

* * * * *

UNITED STATES PATENT AND TRADEMARK OFFICE
CERTIFICATE OF CORRECTION

PATENT NO. : 8,049,995 B1
APPLICATION NO. : 12/344429
DATED : November 1, 2011
INVENTOR(S) : Kuen Chee Ee et al.

It is certified that error appears in the above-identified patent and that said Letters Patent is hereby corrected as shown below:

In claim 21, column 10, line 25, delete "radius diameter/2" and insert --radius (diameter/2)--.

Signed and Sealed this
Thirteenth Day of December, 2011

David J. Kappos
*Director of the United States Patent and Trademark Office*